United States Patent
Lindelof et al.

[15] 3,692,320
[45] Sept. 19, 1972

[54] CHUCK APPARATUS

[72] Inventors: Leonard A. Lindelof; Albert L. Linn, both of Minneapolis, Minn.

[73] Assignee: E. J. Longyear Company, Minneapolis, Minn.

[22] Filed: Oct. 19, 1970

[21] Appl. No.: 81,697

[52] U.S. Cl. .................................. 279/4, 173/149
[51] Int. Cl. ............................................ B23b 5/22
[58] Field of Search ........... 279/4, 122, 123; 173/149

[56] References Cited

UNITED STATES PATENTS

| | | | |
|---|---|---|---|
| 3,212,591 | 10/1965 | Tucker | 279/4 |
| 2,695,096 | 11/1954 | Gridley | 279/4 |
| 2,768,830 | 10/1956 | Janson | 279/4 |

*Primary Examiner*—Gerald A. Dost
*Attorney*—Dugger, Peterson, Johnson & Westman

[57] ABSTRACT

A chuck assembly having a chuck body that mounts a plurality of jaw assemblies for radially movement between a rod clamping and a rod release position, a chuck hood axially movable relative the body for releasably retaining the jaw assemblies in a clamping position, a piston cylinder combination for moving the hood relative the body to a jaw release position, and a spring loading assembly for resiliently urging the hood to a jaw clamping position that includes resilient mechanism that is retained in a compressed condition even though the hood is removed; and a hydraulic swivel head for mounting the chuck assembly and rotating the chuck body relative the hood.

22 Claims, 7 Drawing Figures

INVENTORS
LEONARD A. LINDELOF
ALBERT L. LINN
BY
Dugger Peterson Johnson & Westman
ATTORNEYS INVENTORS
LEONARD A. LINDELOF
ALBERT L. LINN
BY
Dugger, Peterson Johnson + Westman
ATTORNEYS

INVENTORS
LEONARD A. LINDELOF
BY ALBERT L. LINN

Dugger Peterson Johnson & Westman
ATTORNEYS

3,692,320

CHUCK APPARATUS

BACKGROUND OF THE INVENTION

A hydraulic chuck assembly that is hydraulically operated between a rod gripping position and a rod release position. U.S. Pat. No. 2,684,857 to Chrimacker discloses a chuck assembly that has a member mounting jaws for radial movement wherein the jaws are resiliently urged to a rod release position and a body having surfaces for moving the jaws inwardly to a rod gripping position. The jaw mounting member and body are resiliently urged together. However to replace the jaws of Chrimacker is relatively complex and requires compressing springs in order to place the chuck in working order after replacing the jaws. Further there is no suggestion in Chrimacker of a hydraulic apparatus for moving a chuck hood relative a chuck body between a jaw clamping and a jaw release position. An example of a hydraulic chuck is disclosed in U.S. Pat. No. 2,730,331 to Harnick wherein the hydraulic pressure for hydraulically operating the chuck is controlled by the operation of the pistons of the piston cylinder combinations for moving the cross head on which the chuck is mounted. This hampers the release of the chuck jaws when said pistons are at positions intermediate the ends of the piston stroke and involves disassembling a piston cylinder when the rod gripping chuck is to be replaced. In order to provide a chuck assembly in which the chuck jaws may be readily replaced, and to overcome other problems, this invention has been made.

SUMMARY OF THE INVENTION

Chuck apparatus for releasably gripping a rod that includes an axially elongated chuck body that mounts jaw assemblies for radial movement, a chuck hood axially movable on the body to releasably retain the jaw assemblies in a gripping position, preloaded spring mechanism connecting the hood to the body to permit limited axial movement of the hood relative to the body and resiliently urge the hood to move relative the body in one axial direction, and permit removal of the hood from the body while retaining the springs in a compressed condition.

One of the objects of this invention is to provide chuck apparatus having new and novel spring mechanism to releasably connect the chuck hood to the chuck body and resiliently urge the hood relative the body in one axial direction and permit disconnecting the hood from the body while retaining the springs in a preloaded compressed condition. In furtherance of the above object, it is a further object of this invention to provide a preloaded spring plate fixedly secured to the chuck body, bars axially movable between the plate and a portion of the chuck body and elongated members slidably extended through the plate and removably connected to the bars to limit the axial movement of the hood relative the body in a direction opposite said one axial direction.

An additional object of this invention is to provide new and novel chuck apparatus that includes annular cylinder mechanism having annular, axially extending legs surrounding an axial portion of the chuck body and axially movable relative thereto for exerting an axial force on the chuck hood to move the hood relative the body in one axial direction and an annular piston extending between said legs. In furtherance of the last mentioned object, it is a further object of this invention to resiliently urge the chuck hood to move toward the cylinder for moving the chuck jaws toward a rod clamping position.

Figure 1:
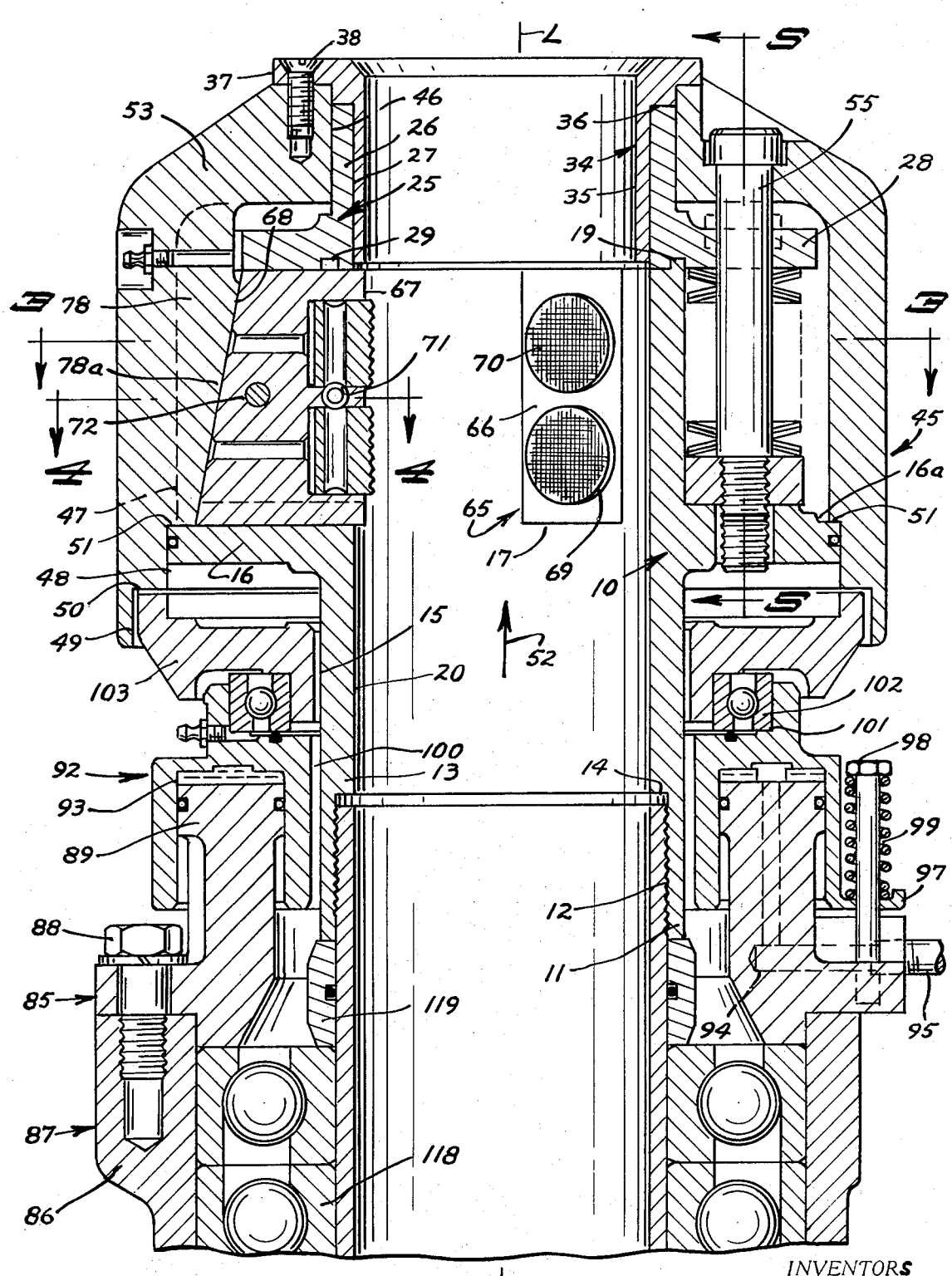
FIG. 1 is a vertical cross sectional view of the hydraulic chuck assembly of this invention, said view being generally taken along the line and in the direction of the arrows 1—1 of FIG. 3, and also showing in cross section, the upper end portion of a hydraulic swivel head on which the assembly is mounted.
Figure 2:
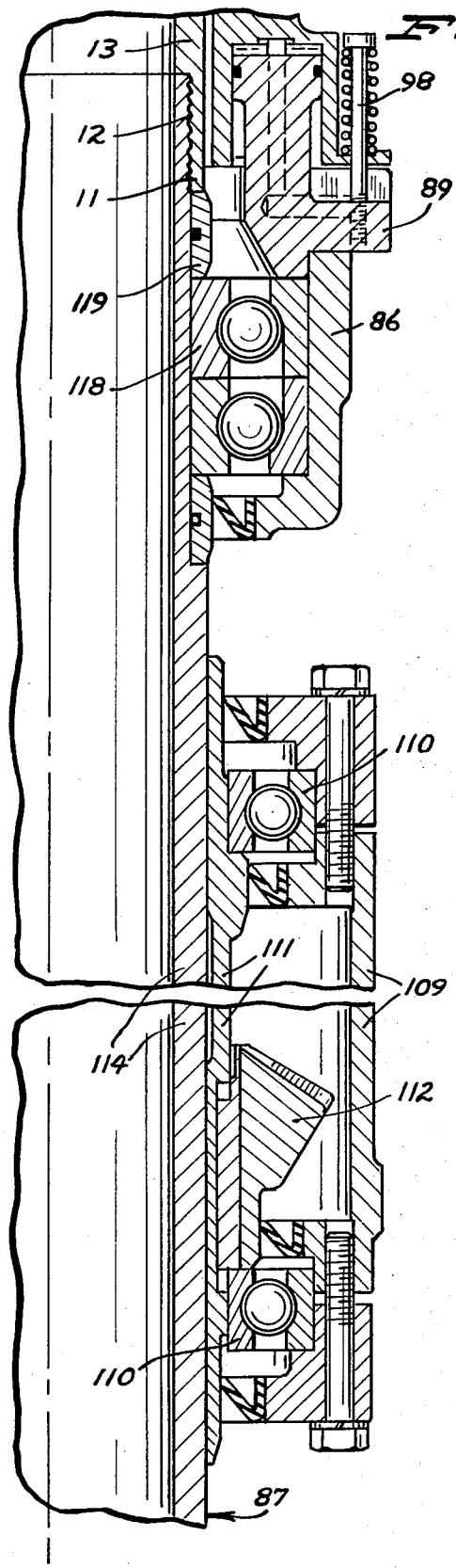
FIG. 2 is a fragmentary vertical cross sectional view of the swivel head with a central portion thereof being broken away, said view also illustrating the lower portion of the chuck assembly.
Figure 3:
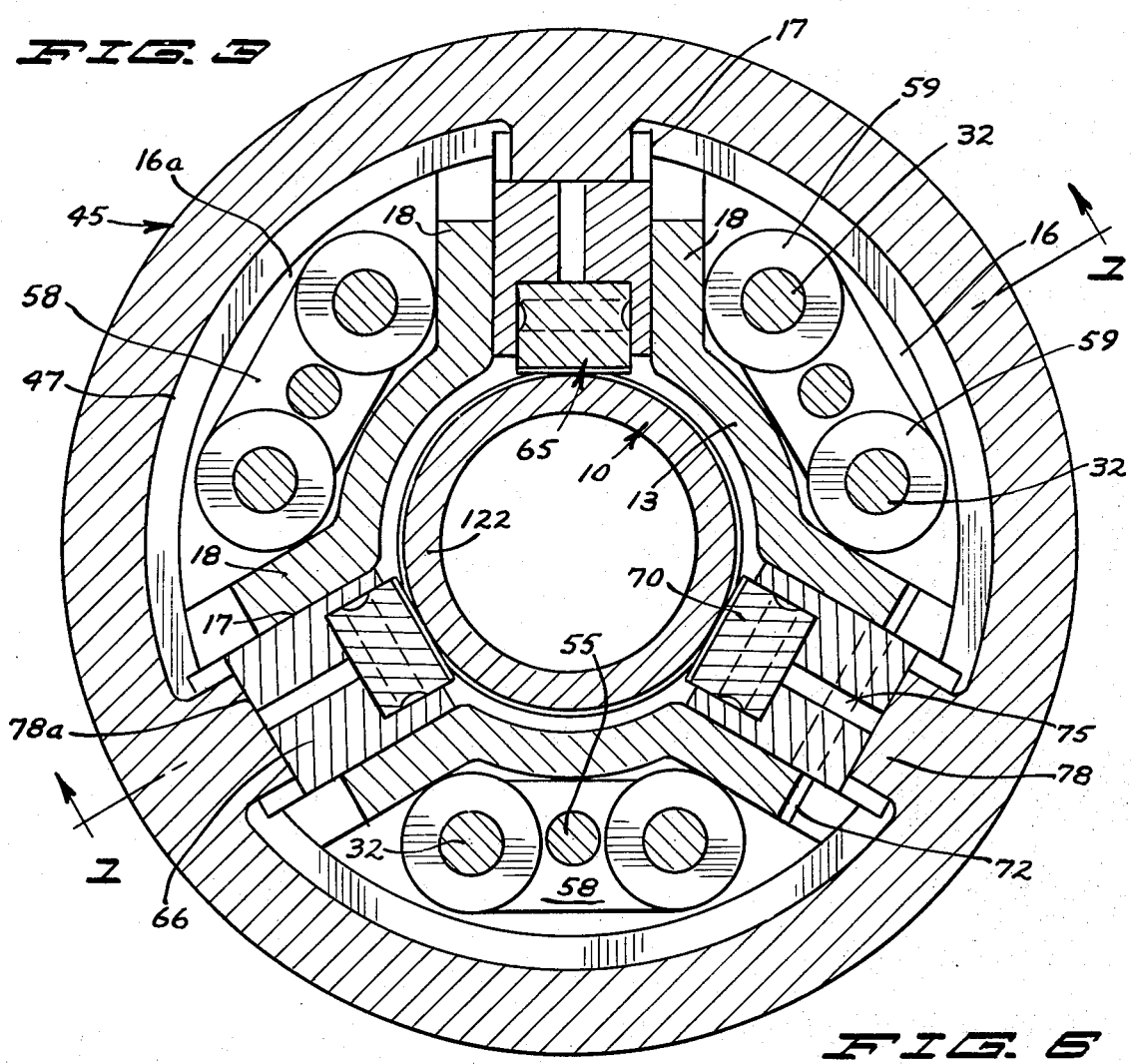
FIG. 3 is a horizontal cross sectional view of the hydraulic chuck assembly, said view being generally taken along the line and in the direction of the arrow 3—3 of FIG. 1.
Figure 7:
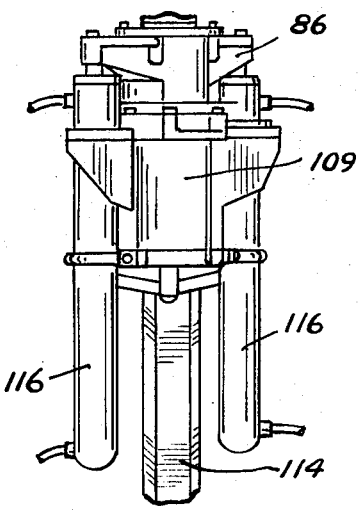
FIG. 7 is a fragmentary perspective view of the hydraulic swivel drill head that is in part illustrated in FIGS. 1 and 2.
Figure 6:
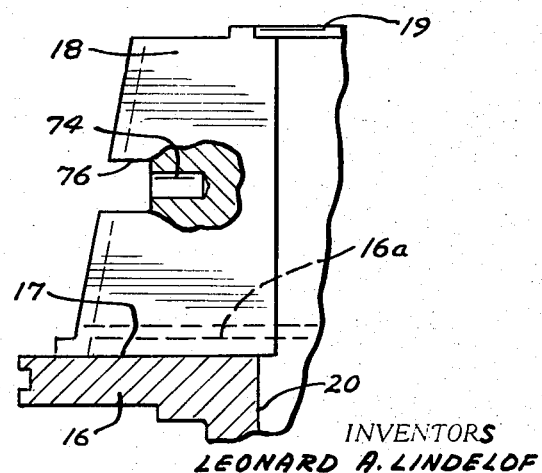
FIG. 6 is a fragmentary vertical cross sectional view of just the chuck body, said view being generally taken along and in the direction of the arrows 6—6 of FIG. 4.

Referring in particular to FIGS. 1-3, the hydraulic chuck assembly includes a chuck body, generally designated 10. The chuck body 10 includes a tubular portion 13 having an annular end portion 11, and an internally threaded portion 12 extending above portion 11, the tubular portion 13 terminating at the upper end of the chuck body. Tubular portion 13 has a constant inner diameter bore 20 that extends from threaded portion 12 to adjacent the upper end of the chuck body. Bore 20 and threaded portion 12 are of relative diameters to form a downwardly facing shoulder 14.

Axially intermediate the opposite end portions of bore 20, the chuck body has a radially outwardly extending, annular flange 16 that is integrally joined to tubular portion 13 and has a substantially larger outside diameter than the diameter of the generally constant diameter chuck body outer wall 15 that extends therebeneath. A plurality of circumferentially spaced, generally radially extending slots 17 are provided in the chuck body to open through the upper edge thereof and to open to the bore, the lower portions of the slots 17 extending through the upper reduced diameter portions 16a of the radial flange 16. In part defining the side walls of each of the slots and integrally joined to tubular portion 13 to extend outwardly therefrom are a pair of vertical flanges 18. The flanges 18 extend vertically from the upper end of the tubular portion 13 to have the lower edges integrally joined to the radial flange 16, the adjacent vertical surfaces of each pair of vertical flanges 18 being parallel to one another. The upper end of the tubular portion 13 has axially extending, arcuate flanges 19 extending circumferentially between slots 17, the inner diameters of the vertical flanges 19 being substantially larger than the diameter of bore 20 to provide an upwardly facing shoulder. The outer diameter of flanges 19 is the same as wall 15.

Mounted on the chuck body to extend outwardly therefrom is an annular preloading spring plate, generally designated 25, the spring plate including an axially elongated, tubular portion 26 having a substantially constant inner diameter bore 27 of approximately the same diameter as bore 20. Integrally joined to the lower part of tubular portion 26 is a radially outwardly extending flange 28 that is of a smaller outer diameter than the maximum outer diameter of flange 16. In the lower end portion of the spring loading plate, adjacent the junction of tubular portion 16 and flange 28, there is provided a downwardly opening, annular groove 29 into which the arcuate flanges 19 extend.

Figure 5:
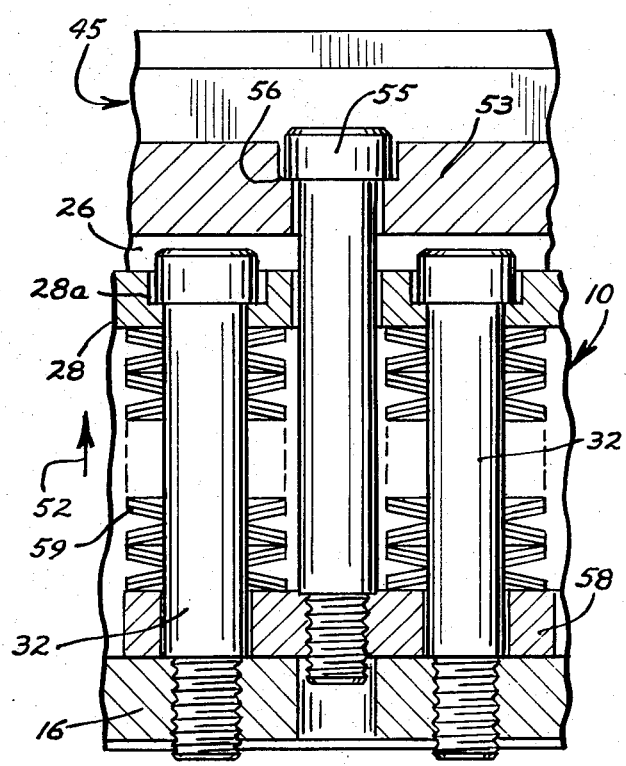
FIG. 5 is a fragmentary vertical sectional view of the hydraulic chuck assembly, said view being generally taken along the line and in the direction of the arrows 5—5 of FIG. 1 to more fully illustrate the spring loading feature.

For retaining the preloading spring plate 25 in abutting engagement with the upper end portion of the chuck body, a plurality of circumferentially spaced socket head shoulder screws 32 are slidably extended through apertures in the radial flange 28 and threaded into the radial flange 16; the head ends of the screws seating on the upwardly facing shoulders 28a of flange 28 such as shown in FIG. 5. Assuming that the three slots 17 provided in the chuck body, than between each circumferentially adjacent pair of slots there would be provided, for example two spaced screws 32.

Mounted on the preloading spring plate 25 is a drive rod bushing, generally designated 34, that has an axially elongated tubular portion 35 of an inside diameter to form a relatively close fit with the rod 122 to be gripped by the chuck assembly and an outside diameter to form a close fit with the inner peripheral wall 27 of tubular portion 26. The bushing 34 has a downwardly facing shoulder 36 that bears against the upper annular edge of tubular portion 26, tubular portion 35 being of a length to terminate at a higher elevation than the preloading spring plate. The bushing also has a radially outwardly extending flange 37 that in part overlies the chuck hood, generally designated 45, and is secured to the generally radially extending portion 53 by a plurality of circumferentially spaced screws 38. The radial portion 53 of the chuck hood has a reduced diameter bore 46 that forms a close fit with the outer peripheral wall of tubular portion 26 at an elevation above flange 28. The hood also has an axially intermediate interior chamber 47 that is of a substantially larger inner diameter than the diameter of the bore 46 and the outer diameter of flange 28, and that extends axially downwardly to an elevation substantially the same as the bottom horizontal edges of slots 17; a third bore portion 48 of a slightly larger diameter than the maximum diameter of chamber 47 and that forms a relatively close fit with the maximum outer diameter circumferential edge of flange 16, chamber 47 and bore 48 forming a downwardly facing shoulder 51 that seats against the adjacent edge portion of flange 16; and a fourth bore portion 49 that is of a substantially larger diameter than bore 48, bores 48 and 49 forming a downwardly facing shoulder 50.

The chuck hood is movable axially outwardly in the direction of the arrow 52 relative the chuck body from a position that shoulder 51 abuts against radial flange 16 to a position substantially spaced from flange 16. In order to permit the aforementioned axial movement and at the same time secure the chuck hood to the chuck body to rotate therewith, a plurality of circumferentially spaced, socket head shoulder screws 55 extend through circumferentially spaced apertures provided in the upper end portion of the chuck hood to have their head ends seat against the upwardly facing shoulders 56 in the chuck hood, their intermediate portions slidably extended through apertures in the radial flange 28, and their lower ends threaded into the intermediate portion of the adjacent bar 58. Each bar 58 is horizontally elongated. Assuming that there are three slots 17, then there would advantageously be provided three bars 58. In such a case, each end portion of the bar 58 has the intermediate portions of the adjacent pair of screws 32 slidably extended therethrough. On each screw 32 there is provided a spring or a Belleville washer 59 that has its lower end abutting against the adjacent portion of bar 58 and its upper end abutting against flange 28 for resiliently retaining bar 58 in abutting engagement with flange 16. Since the bars 58 are resiliently retained in abutting engagement with flange 16, the bars acting through screws 55 retain the chuck hood in a position that bushing 34 has its shoulder 36 retained in abutting engagement with plate 25.

Figure 4:
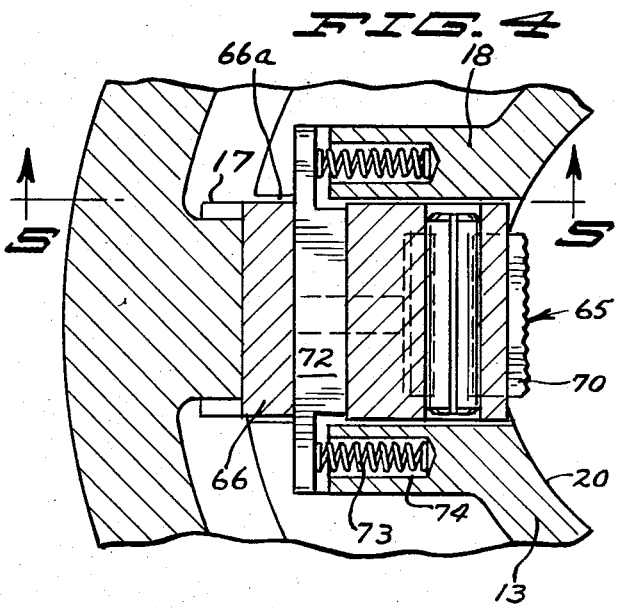
FIG. 4 is a fragmentary, horizontal cross sectional view showing the construction of a jaw assembly and the mounting of the jaw assembly, said view being generally taken along the line and in the direction of the arrows 4—4 of FIG. 1.

Referring in particular to FIGS. 1, 3 and 4, for each slot 17 is provided a jaw assembly, generally designated 65. Each jaw assembly includes a block 66 of a height to extend from the bottom edge of the slot 17 to the upper edge thereof and of a width slightly less than the distance between the adjacent pair of vertical flanges 18. The vertical inner surface 67 of the block is generally planar to extend parallel to the longitudinal central axis L—L of the chuck assembly, while the opposite surface 68 is planar at an angle to taper toward the central axis L—L in an upwardly direction. Thus in vertical cross section, in a plane pass through the central axis of the hood, the block has an upper minor base and a lower major base such as shown in FIG. 1. The top and bottom surfaces of the block are parallel to one another and perpendicular to axis L—L. The side surfaces 66a of the block are parallel to one another and parallel to the axis L—L. Thus each block and its slot (defined by flanges 16, 18, 18, 29) are rectangular in vertical cross sectional perpendicular to the adjacent walls of flanges 18 that in part define the slot.

Provided in each jaw block are vertically spaced cylindrical wells 69, each well 69 having a central axis that would intersect the central axis of bore 20 and opening to said bore. In each well 69 there is provided a generally cylindrical jaw 70 that has a rough gripping surface extending more closely adjacent the longitudinal axis L—L of the hood than surface 67, the opposite surfaces of the jaws bearing against the block. A radial aperture 75 opens to each well to facilitate removing the jaws from the wells. Each jaw has a circumferential groove, a transverse aperture extending through each jaw block to have a transverse pin 71 inserted therein to extend into the circumferential grooves of the jaws mounted by the respective block for releasably retaining the jaws in the above described positions. Radially outwardly of each pin 71, each block is provided with a transverse aperture in which there is mounted a transverse pin 72 to extend parallel to surface 67. Each axially outer end portion of the pin 72 is flattened to have one end of the coil spring 73 bear thereagainst, each coil spring being extended into an aperture 74 in the adjacent vertical flange 18 (see FIG. 4) that opens toward the portion of a hood that defines chamber 47. The end portions of each pin extends into the adjacent horizontal notch 76 in the adjacent flange 18, the apertures 74 opening to notches 76. As a result of providing the spring 73 and pin 72, each jaw block is resiliently urged in a direction radially away from the longitudinal axis L—L.

For releasably retaining each jaw assembly in a position that the jaws extend radially into the bore 20 (radially more closely adjacent axis L—L than the wall defining bore 20) for each jaw, the hood is provided with a protrusion 78 that extends radially toward the axis L—L to be more closely adjacent thereto than the remainder of the generally circumferential wall that defines chamber 47. Each protrusion 78 has a tapered planar surface 78a that is of an opposite taper from surface 68 to form a close fit therewith. That is, in the direction of the arrow 52, the surface 78a extends progressively closer to the longitudinal axis L—L. Further, each protrusion is of a width slightly less than a corresponding width adjacent portion of slot 17 that is formed in flange 16 the protrusions terminating at the bottom wall of a respective slot 17 (assuming that shoulder 51 is bearing against flange 16). The springs 73 acting through pins 72 resiliently retains the jaw blocks 66 in a position that surfaces 68a abut against the adjacent surface 78a.

A generally annular piston 85 has tab portions secured to the cross head 86 of the hydraulic swivel head assembly, generally designated 87, by circumferentially spaced shoulder screws 88. The piston extends upwardly from the cross head and has an enlarged diametric upper, annular end portion 89 that has inner and outer peripheral walls that form a close sliding fit with the depending annular legs of the cylinder, generally designated 92. The annular web portion of the cylinder, the upper annular horizontal surface of the piston and the portions of the cylinder legs between the piston upper surface and the lower surface of the web form an expansible cylinder chamber 93 into which hydraulic fluid may be forced under pressure for moving the cylinder axially in the direction of the arrow 52 relative the piston.

The piston is provided with a passageway 94 that at one end opens to the chamber 93 and at the opposite is in fluid communication with the line 95 that is connected to a suitable source of hydraulic fluid under pressure and which is provided with an appropriate control for selectively applying fluid under pressure to the chamber 93 and permitting exhausting fluid from the chamber. A plurality of circumferentially spaced, vertical cap screws 98 have their intermediate portions slidably extended through appropriate apertures in radially outwardly extending lugs 97 of the cylinder and their lower ends threaded into radially outwardly extending lugs of the piston. Springs 99 are provided on the screws 98 for bearing against the head end of the screws and the lugs 97 for resiliently urging the cylinder to its retracted position relative the piston.

The inside diameter of the cylinder (bore 100) is greater than the diameter of the outer circumferential wall 15 of the chuck body, the cylinder in its retracted position being in part radially opposite the internal threads 12 of the chuck body. The cylinder is also provided with an enlarged bore portion that forms an upwardly facing shoulder 101 for mounting an annular bearing 102 with the bearing outer race bearing against the vertical inner surface of the bore portion, a thrust plate 103 having an axially extending lower flange portion of a substantially larger inside diameter than tubular portion 13 extended axially between the bearing 102 and the tubular portion 13. The inner race of bearing 102 supportingly mounts the thrust plate 103, the inner race bearing against a vertical annular surface of the thrust plate lower flange. The thrust plate has an enlarged diameter, upper, axially extending flange extending adjacent to the shoulder 50, but that is axially spaced therefrom when the cylinder is in its retracted position. However, upon applying fluid under pressure to the chamber 93, the cylinder moves axially upwardly and through the bearing 102 and thrust plate 103 moves the chuck hood upwardly (in the direction of the arrow 52) relative the chuck body. The axial length of tubular portions 26 and 35 is sufficiently great that they are in part radially opposite one another even when the cylinder is in its fully expanded position relative the piston.

In order to more fully understand the operation of the hydraulic chuck assembly of this invention, the hydraulic swivel head assembly 87 will be briefly described. The assembly 87 includes a swivel frame 109 that mounts two vertically spaced bearing members 110 that in turn rotatably mount an axially elongated drive quill 111. A beveled gear 112 is keyed to the drive quill for rotating the drive quill, gear 112 being driven through conventional structure (not shown) of assembly 87. An axially elongated drive rod 114 is slidably extended through the drive quill to be rotatably driven thereby, the upper end portion of the drive rod having external threads that form a matching fit with the treads 12 of the chuck body. The drive rod has an inner diameter that is substantially the same as the diameter of bore 20 of the chuck body.

A pair of vertical piston cylinder combinations 116 have their cylinders mounted by the swivel frame 109 and their piston rods connected to the cross head 86 for reciprocating the cross head from an elevation close to the upper end of the drive quill and an elevation substantially remote from the drive quill. The cross head mounts bearings 118 to permit the drive rod being rotated relative the cross head, a spacer 119 being provided axially between the adjacent inner race of the top bearing 118 and the lower end portion 11 of the chuck body whereby the chuck body is supported by the cross head but at the same time is rotatable relative thereto. The piston has a portion radially opposite a spacer 119 that extends a slight distance downwardly into the cross head to abut against the outer race of the adjacent bearing 118.

For purposes describing the use of the chuck apparatus of this invention, it will be assumed that the chuck assembly is in the condition of FIG. 1 and is mounted on the cross head of 86, that a drill stem rod 122 is extended through the drive rod 114, that the jaws 70 are in gripping engagement with the drill stem rod, and that the cross head 86 is at a substantially higher elevation relative the drive quill and frame 109 than that illustrated in FIG. 2. Further, it will be assumed that the beveled gear 112 is being driven and fluid under pressure is being applied to piston cylinder combinations 116 for resiliently urging the cross head to a position more closely adjacent the drive quill. Since the jaws are in clamping engagement with the drill stem rod, the downward pressure is exerted on the cross head and thus applied to the drive quill, the chuck body and the jaws to move the drill stem rod downwardly and at the same time rotate the drill stem rod. After the cross head has been moved to its lower position relative the drive quill, the drive to beveled gear 112 is discontinued whereby the rotation of the chuck body relative the chuck hood is discontinued. A conventional safety clamp is operated to clampingly engage the drill stem rod to prevent it from moving downwardly relative the swivel head assembly 87.

Now fluid under pressure is applied through line 95 which forces the cylinder 92 to move upwardly relative the piston. The initial upward movement of the cylinder brings the thrust plate 103 into abutting engagement with the shoulder 50 of the chuck hood, and then the continued upwardly movement of the cylinder results in the chuck hood and bushing 34 being moved in the direction of the arrow 52 relative the chuck body and the preloading spring plate 25, it being noted that the screws 32 prevent the plate 25 being moved in the direction of the arrow 52 relative the chuck body. The upwardly movement of the chuck hood, through screws 55 results in the bars 58 being moved in the direction of arrow 52 away from flange 16 to thereby compress the washers 59.

At the same time that the washers 59 are being compressed, the protrusions 78 of the chuck hood move upwardly relative the jaws, and accordingly the surfaces 78a bears against the jaw blocks at progressively higher elevations. Due to the relative tapers of surfaces 78a and the adjacent tapered surfaces of the jaw blocks, and the provision of the springs 73, the jaw blocks are permitted to and do move radially outwardly from the longitudinal axis L—L. This movement of the jaw blocks through the pins 71 move the jaws 70 out of clamping engagement with the drill stem rod.

After the jaws have moved out of clamping engagement with the drill stem rod, and while fluid under pressure is maintained in line 95, fluid under pressure is applied to the piston cylinder combinations 116 for moving the cross head upwardly relative the drive quill and thereby move the entire chuck assembly in the same direction. After the cross head has been moved to its upper relative position, the fluid in the expansible chamber is permitted to exhaust therefrom, and thence the springs 99 resiliently urge the cylinder to move in a direction opposite arrow 52 to its retracted position relative the piston. As the cylinder moves to its retracted position, the chuck hood is moved in the direction opposite arrow 52 through the washers 59 acting against bars 58. As the chuck hood moves in a direction opposite arrow 52, the protruding surfaces 78a forces the jaw blocks radially inwardly to bring the jaws 70 into clamping engagement with the drill stem rod. This movement of the chuck hood is limited by the shoulder defined by bores 47, 48 abutting against flange 16, whereupon the continued movement of the cylinder in the direction opposite arrow 52 results in the thrust plate being slightly axially spaced from shoulder 50. Now the safety clamp may be removed and this drilling operation continued.

The thrust plate 103 is mounted on a thrust bearing 102 so that if the chuck jaws are accidentally clampingly disengaged from the drill stem rod while still rotating, the chuck hood would not engage the cylinder to through frictional contact with the cylinder result in damage to the cylinder. At the same time the thrust plate is provided for transferring an upwardly force to the chuck hood. It is to be understood that the thrust plate may be fixedly joined (for example threadably connected) to the chuck hood, provided a suitable mounting permits free rotation of the thus modified thrust plate to permit thrust plate freely rotating relative the cylinder but at the same time to permit the transfer of axial movement of the thrust plate to the remainder of the thus modified hood. However the thus modified hood would make the replacement of the jaws more difficult.

One of the features of this invention is the provision for the easy replacement of the jaw assembly. In order to replace the jaw assemblies, only the screws 55 have to be removed and thence the hood and bushing 34 may be moved axially away from the remainder of the chuck assembly. Thence the pins 72 may be transversely removed whereby the jaw assemblies are disconnected from the chuck body. Now the jaw assemblies may be radially moved outwardly and replaced either by jaw assemblies of different sizes or of the same size, the pins 72 reinserted, and the hood and bushing moved downwardly to the position of FIG. 1 to be attached to the bars 32 through the screws 55. As may be noted, the screws 32 being slidably extended through the bars 58 retained the bars in fixed angular and radial positions relative the chuck body and thus the beveled washers are retained in a compressed position even when the hood is removed from the chuck body. Accordingly there is no problem encountered in having to compress heavy duty springs 58 in replacing the jaw assemblies. As a result, with this invention, the jaw assemblies may be more readily replaced than possible with hydraulic chucks of the prior art.

It is to be understood that the hydraulic chuck assembly of this invention can be used in conjunction with apparatus other than hydraulic swivel head assemblies; and that the hydraulic chuck assembly has only been described as being used in conjunction with a hydraulic swivel head assembly for purposes of more readily understanding the invention. Further it is to be understood that the chuck assembly of this invention may be used where the axis L—L extends in other than a vertical direction.

We claim:

1. Chuck apparatus comprising a generally annular, axially elongated chuck body, adapted to be mounted on a tubular member, a chuck jaw assembly mounted by the chuck body for radial movement between a rod gripping position extending into the body interior and a rod release position, a chuck hood on the chuck body and axially movable relative body, first means for connecting the chuck body to the hood and resiliently urging the hood to move relative the body in an axial first direction and hydraulic means surrounding at least an axial portion of the body body for selectively forcing the hood to move relative the body in an axial second direction, said hood having second means for forcing the jaw assembly to its rod gripping position as the hood moves relative the body in one of said axial directions, said first means including a first plate abutting against the chuck body, third means for connecting the plate to the chuck body to retain the plate in substantially fixed angular and axial positions relative the chuck body, and resilient fourth means connecting the hood to the plate for axial movement relative the plate and resiliently urging the hood to move relative the plate in the first direction, said hood, body and plate each having radially extending portions, the plate portion being located axially between the hood and body portions, and said fourth means including an elongated first member axially slidably extended through the hood and plate portions, said first member having a first end portion for abutting against the hood portion and a second end portion, a second member mounted on the second end portion in a fixed position, and means for abutting against the plate and second member for resiliently urging the second member axial in the first direction.

2. The apparatus of claim 1 further characterized in that there is provided more than one fourth means, each fourth means being substantially angular spaced about the chuck body from the other fourth means, and that said elongated member comprises a bolt threaded into the second member.

3. The apparatus of claim 2 further characterized in that the second member is mounted by the third means for axial slidably movement relative thereto and is retained in a fixed angular position by the third means.

4. The apparatus of claim 3 further characterized in that the chuck body includes a tubular portion and a pair of spaced vertical flanges joined to the tubular portion to extend outwardly from the tubular portion, said vertical flanges and tubular portion having walls that at least in part define a slot in which the jaw assembly is mounted, said jaw assembly including a jaw member slidably located in said slot for movement between the jaw assembly positions, said slot being of a size and shape to permit the jaw member being freely moved radially outwardly of the slot for replacing the jaw member.

5. The apparatus of claim 3 further characterized in that each of the plate and body radial portions comprises a radially extending annular flange, and that the annular flanges have wall portions that in part define said slot.

6. The apparatus of claim 5 further characterized in that the plate has an axially extending tubular portion, that there is provided a bushing fixedly secured to the hood, the plate tubular portion being at least partially extending radially intermediate the hood radial portion and the bushing in axially slidably relationship to the hood and bushing.

7. The apparatus of claim 6 further characterized in that the hydraulic means comprises an annular piston cylinder combination surrounding at least an axial portion of the body remote from the plate, said cylinder having axially extending, annular legs and a web portion joining said legs.

8. The apparatus of claim 7 further characterized in that the legs extend away from the web portion in a direction away from the hood, that said combination includes an annular piston, said cylinder being mounted by the piston, and means mounted by the cylinder for moving the hood relative chuck body in the second direction when fluid under pressure is applied to the cylinder.

9. A chuck assembly adapted to be mounted by a first member and an axially elongated second member rotatably movable about its axis of elongation within the first member, comprising an annular piston adapted to be fixedly attached to the first member, an annular cylinder mounted by the piston for axial movement relative the piston, the cylinder having axially elongated annular legs, a chuck body having an axially elongated tubular portion, said tubular portion having a first end adapted to be fixedly attached to the second member and a second end, a plurality of angularly spaced jaw assemblies mounted by the chuck body for radial movement between a first position extending into the tubular portion and a second position radially outwardly of the first position, a hood mounted on the chuck body for axial movement relative thereto, said hood having first means for moving the jaw assemblies from their second position toward their first position as the hood is axially moved toward the piston, second means mounted by the cylinder for moving the hood axially away from the piston when fluid under pressure is applied to the cylinder with the cylinder and piston in their relative retracted positions, third means for connecting the hood to the chuck body for relative axial movement and resiliently urging the hood toward the piston, said hood having a radially extending portion remote from the piston, a plurality of spaced bolts axially slidably extended through the hood radial portion and having head ends abutting against the hood radial portion remote from the piston and opposite threaded ends axially more closely adjacent the piston, and fourth means connected to chuck body and having the bolts opposite ends threadly connected thereto for resiliently urging the hood axially toward the piston, limiting the movement of the hood relative the chuck body in each axial direction and permitting the hood moving axially away from the piston a limited amount.

10. The apparatus of claim 9 further characterized in that the chuck body has a flange portion extending radially outwardly of the tubular portion axially intermediate the piston and the hood radial portion, and that the fourth means includes block means mounted on the bolts threaded ends intermediate the hood radial portion and the flange portion, and fifth means connected to the body flange portion for resiliently urging the block means toward the flange portion, blocking angular movement of the block means relative the body and permitting axial movement of the block means a substantial distance away from the flange portion in a direction away from the piston.

11. The apparatus of claim 10 further characterized in that the hood radial portion has a central aperture therethrough and that the fifth means includes an annular plate abutting against the tubular portion second end, the annular plate having an axially extending portion extending within the hood aperture and an radially extending flange axially between the hood radial portion and the block means, and sixth means for retaining the plate flange in a fixed angular and axial position relative the body flange portion.

12. The apparatus of claim 11 further characterized in that fifth means includes spring means extending between the block means and the plate flange, that the sixth means is extended through the spring means and that the bolts are axially slidably extended through the plate flange.

13. The apparatus of claim 11 further characterized in that the body includes a pair of spaced vertical flanges joined to the body tubular portion to extend generally radially outwardly therefrom, said vertical flanges and body tubular portion at least in part defining a slot that is generally rectangular in vertical cross section and opens to the tubular portion interior and the hood first means, said body vertical flanges having radially outwardly opening notches, said jaw assemblies includes a jaw block radially slidably located in said slot, a transverse pin extended through the jaw block and into said notches notches and resiliently means located in said notches for resiliently urging the pin and thereby the jaw block radially outwardly, said jaw block and first means having adjacent abuttable tapered surfaces tapering radially inwardly in an axial direction away from the piston.

14. In a chuck assembly adapted to be mounted by a first member and an axially elongated second member rotatably movable about its axis of elongation within the first member, comprising a chuck body having an axially elongated tubular portion, said tubular portion having a first end adapted to be fixedly attached to the second member and a second end, a plurality of angularly spaced jaw assemblies mounted by the chuck body for radial movement between a first position extending into the tubular portion and a second position radially outwardly of the first position, a hood mounted on the chuck body for axial movement relative thereto, said chuck body having a flange portion joined to the tubular portion to extend radially outwardly of the tubular portion axially intermediate the tubular portion ends, said hood having a flange portion, and first means for interconnecting the flange portions, limiting the axial movement of the hood relative the body in a first axial direction and resiliently urging the hood to move relative the body in an opposite second axial direction, said hood having an axially elongated, generally annular portion surrounding at least a part of the chuck body and second means for forcing the jaw assemblies from their second position toward their first position as the hood is moved axially relative the body in one of said axial directions, said first means including a rigid member axially movable between the flange portion, third means of the chuck body for limiting the axial movement of the rigid member in a direction toward the hood flange, axially elongated fourth means fixedly connected to the rigid member and axially slidably mounted by the third means for acting in cooperation with the third means to limit the axial movement of the hood relative the body in the first axial direction and fifth means abutting against the rigid member to resiliently urge the rigid member to move axially in the second axial direction.

15. The apparatus of claim 14 further characterized in that the hood annular portion has a shoulder abuttable against the chuck body to limit the movement of the hood relative the body in the second axial direction.

16. The apparatus of claim 14 further characterized in that the third means includes axially elongated sixth means for retaining the rigid member in a fixed angular position relative the body and hood.

17. The apparatus of claim 14 further characterized in that the hood flange portion extends radially and has a central aperture axially aligned with the tubular portion and that the third means includes an annular plate having an axially tubular portion slidably extended into said aperture to form a close fit with the wall defining said aperture, and a flange axially between the hood flange and the rigid member, said plate being in abutting relationship with the body tubular portion second end, and elongated seventh means for fixedly securing the plate flange to the body flange.

18. The apparatus of claim 14 further characterized in that the body flange portion comprises an annular flange having a larger diameter than any portion of the chuck body on either axial side of the body flange, said hood annular portion having one end joined to the hood flange and an opposite end portion of a minimum transverse inner diameter greater than the diameter of said body flange, that there are provided a plurality of angular spaced rigid members, and that the fourth means comprises a plurality of angular spaced bolts having one end threaded into said rigid members and opposite head ends abutting against the hood flange axially opposite the rigid members, the hood and body being of respective sizes and shaped that the bolts being threaded into the rigid members solely block removal of the hood from the body in said first axial direction.

19. The apparatus of claim 14 further characterized in that there is provided an annular cylinder having axially extending annular legs in surrounding relationship to an axial portion of the chuck body, an annular piston adapted to be mounted by the first member and extending between said legs, and sixth means mounted by the cylinder for forcing the hood to move relative the body in the first axial direction when the cylinder and hood are relatively moved from their retracted to their extended positions.

20. The apparatus of claim 19 further characterized in that the sixth means comprises an annular thrust bearing member surrounding the chuck body, and that there is provided means for resiliently urging the cylinder and piston to their retracted positions, the cylinder in the retracted position spacing the thrust bearing member from the hood.

21. The apparatus of claim 19 further characterized in that each jaw assembly includes a jaw block, that the chuck body has a slot for each jaw block that radially slidably receives the respective jaw block, and opens to each of the body tubular portion interior and to the second means, and that each jaw assembly includes means mounted by the respective jaw block and the chuck body to resiliently urge the respective jaw block radially outwardly, said hood solely limiting the radial outward movement of the jaw blocks.

22. The apparatus of claim 19 further characterized in that there are provided more than one rigid members and that the fourth means comprises a plurality of bolts threaded into the rigid members that solely limit the movement of the hood axially in the first direction.

* * * * *